(12) United States Patent
Pan (10) Patent No.: US 11,048,670 B2
(45) Date of Patent: Jun. 29, 2021

(54) NODE LAYOUT DETERMINING METHOD AND APPARATUS, COMPUTING DEVICE, AND COMPUTER READABLE MEDIUM

(71) Applicant: ADVANCED NEW TECHNOLOGIES CO., LTD., Grand Cayman (KY)

(72) Inventor: Yifei Pan, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/859,795

(22) Filed: Apr. 27, 2020

(65) Prior Publication Data

US 2020/0257664 A1    Aug. 13, 2020

Related U.S. Application Data

(63) Continuation of application No. PCT/CN2020/072178, filed on Jan. 15, 2020.

(30) Foreign Application Priority Data

Aug. 27, 2019 (CN) .......................... 201910797836.1

(51) Int. Cl.
G06F 16/182 (2019.01)
H04L 12/24 (2006.01)
H04L 29/08 (2006.01)

(52) U.S. Cl.
CPC .......... *G06F 16/1837* (2019.01); *H04L 41/12* (2013.01); *H04L 67/1042* (2013.01)

(58) Field of Classification Search
CPC .. G06F 16/1837; H04L 41/12; H04L 67/1042
See application file for complete search history.

(56) References Cited

U.S. PATENT DOCUMENTS 6,621,494 B2    9/2003 Matsuoka et al.
6,694,502 B2    2/2004 Mehrotra et al.
(Continued)

FOREIGN PATENT DOCUMENTS

CN    101702655 A    5/2010
CN    103473265 A    12/2013
CN    109783568 A    5/2019

OTHER PUBLICATIONS

First Search dated Apr. 13, 2020, issued in related Chinese Application No. 201910797836.1 (1 page).
(Continued)

*Primary Examiner* — Cam Y T Truong (57) ABSTRACT

A node layout determining method and apparatus, a computing device, and a computer readable medium are disclosed. The node layout determining method comprises: laying out, for a node group comprising a plurality of nodes, the plurality of nodes in the node group according to a correspondence relationship among the nodes in the node group, to obtain relative coordinates of each of the plurality of nodes in the corresponding node group; determining a relationship among node groups according to the correspondence relationship among the nodes in a node database; laying out node groups in the node database according to the relationship among the node groups and numbers of nodes included in the node groups, to obtain group coordinates of each node group; and obtaining true coordinates of each node according to the relative coordinates of each node and the group coordinates of the node group to which the node belongs.

13 Claims, 5 Drawing Sheets

(56) References Cited

U.S. PATENT DOCUMENTS

| | | | |
|---|---|---|---|
| 6,742,003 | B2 | 5/2004 | Heckerman et al. |
| 6,901,555 | B2 | 5/2005 | Hida et al. |
| 6,910,044 | B2 | 6/2005 | Weinberg et al. |
| 7,096,174 | B2 | 8/2006 | Beattie et al. |
| 8,417,446 | B2 | 4/2013 | Mays |
| 8,527,936 | B2 | 9/2013 | Jain et al. |
| 8,825,387 | B2 | 9/2014 | Mays et al. |
| 8,972,501 | B2 | 3/2015 | Mallet et al. |
| 9,235,806 | B2 | 1/2016 | Sweeney et al. |
| 9,258,195 | B1 | 2/2016 | Pendleton et al. |
| 9,262,514 | B2 | 2/2016 | Eckardt, III et al. |
| 9,323,644 | B1* | 4/2016 | Hale .................. G06F 8/22 |
| 9,348,946 | B2 | 5/2016 | Weise et al. |
| 9,441,970 | B2 | 9/2016 | Spindler et al. |
| 9,495,777 | B2 | 11/2016 | Srivastava |
| 10,261,659 | B2 | 4/2019 | Ramanathan et al. |
| 2010/0060643 | A1* | 3/2010 | Kolipaka ............. G06T 11/206 |
| | | | 345/440 |
| 2014/0222854 | A1* | 8/2014 | Lee .................. H04L 67/306 |
| | | | 707/767 |
| 2016/0378163 | A1* | 12/2016 | Bose .................. G06F 1/329 |
| | | | 713/320 |
| 2017/0222873 | A1* | 8/2017 | Lee .................. H04L 41/12 |
| 2017/0330094 | A1* | 11/2017 | Lindsley ............. G06N 5/02 |
| 2018/0246988 | A1* | 8/2018 | Johnson ............. G06F 16/9024 |
| 2018/0295029 | A1 | 10/2018 | Shivanna et al. |
| 2019/0065620 | A1* | 2/2019 | Murray .............. G06N 20/00 |
| 2019/0318068 | A1* | 10/2019 | Melo ................. G06F 21/31 |

OTHER PUBLICATIONS

First Office Action dated Apr. 21, 2020, issued in related Chinese Application No. 201910797836.1, with English machine translation (13 pages).

Second Office Action dated Jun. 16, 2020, issued in related Chinese Application No. 201910797836.1, with English machine translation (14 pages).

* cited by examiner

NODE LAYOUT DETERMINING METHOD AND APPARATUS, COMPUTING DEVICE, AND COMPUTER READABLE MEDIUM

CROSS-REFERENCE TO RELATED APPLICATION

This application is a continuation application of International Patent Application No. PCT/CN2020/072178, filed on Jan. 15, 2020, which is based on and claims priority of the Chinese Patent Application No. 201910797836.1, filed on Aug. 27, 2019. The above-referenced applications are incorporated herein by reference in their entirety.

TECHNICAL FIELD

This specification relates to the technical field of data processing, and more specifically, to a node layout determining method, a node layout determining apparatus, a computing device, and a computer readable medium.

BACKGROUND

To more intuitively and efficiently process data, a layout diagram may be used to indicate a logic relationship among data elements during the data processing. The layout diagram may consist of a plurality of nodes, and each node may correspond to one data element. However, in some application scenarios, data elements themselves may be grouped, and some of these groups may include more data elements. The data element groups including more data elements may be displayed as display regions comprising a plurality of nodes, and thus may take up a relatively large display area in the layout diagram. As a result, display regions of the data element groups may overlap, making it difficult to read the layout diagram and adversely affecting the role of the layout diagram in presenting a logic relationship among the data elements.

SUMMARY

In view of this, embodiments of the specification provide a node layout determining method. At the same time, the specification relates to a node layout determining apparatus, a computing device, and a computer readable medium, to overcome the technical limitations in current technologies.

According to a first aspect of embodiments of the specification, a node layout determining method is provided. The method may be applicable to a node database including a plurality of node groups, each of the node groups may include at least one node, and each node in the node database may correspond to only one of the node groups.

The method may include: laying out, for a node group comprising a plurality of nodes, the plurality of nodes in the node group according to a correspondence relationship among the nodes in the node group, to obtain relative coordinates of each of the plurality of nodes in the corresponding node group; determining a relationship among the node groups according to the correspondence relationship among the nodes in the node database; laying out the node groups in the node database according to the relationship among the node groups and numbers of nodes included in the node groups, to obtain group coordinates of each node group; and obtaining true coordinates of each node according to the relative coordinates of each node and the group coordinates of the node group to which the node belongs. For a node group including one single node, the true coordinates of the single node may be the group coordinates of the node group to which the single node belongs.

According to a second aspect of embodiments of the specification, a node layout determining apparatus is provided. The apparatus is applicable to a node database including a plurality of node groups, each of the node groups may include at least one node. The apparatus may include a memory and a processor. The memory may be configured with instructions executable by the processor to perform operations.

The operations may include laying out, for a node group comprising a plurality of nodes, the plurality of nodes in the node group according to a correspondence relationship among the nodes in the node group, to obtain relative coordinates of each of the plurality of nodes in the corresponding node group; determining a relationship among the node groups according to the correspondence relationship among the nodes in the node database; laying out the node groups in the node database according to the relationship among the node groups and numbers of nodes included in the node groups, to obtain group coordinates of each node group; and obtaining true coordinates of each node in the node database according to the relative coordinates of each node and the group coordinates of each node group. For a node group including a single node, the true coordinates of the single node may be the group coordinates of the node group to which the single node belongs.

According to a third aspect of embodiments of the specification, a computing device is provided. The computing device may include a memory, a processor, and computer instructions stored on the memory and executable by the processor. The processor may, upon executing the instruction, perform the aforementioned node layout determining method.

According to a fourth aspect of embodiments of the specification, a computer-readable storage medium is provided. The medium may have instructions stored thereon executable by a processor to cause the processor to perform any one of the aforementioned node layout determining methods.

In some embodiments of the specification, a relationship among node groups is determined according to a correspondence relationship among nodes, and layout is performed with the node groups being regarded as layout objects, thereby effectively preventing display regions of the node groups from overlapping. Meanwhile, there is no overlapping among display regions corresponding to the nodes as the nodes are laid out within a node group. Since relative coordinates of each node within a corresponding node group may be obtained in the layout process inside the node group, true coordinates of each node may be obtained in combination with the group coordinates of the node group after the layout. Therefore, by adopting the node layout determining method provided in some embodiments of the specification, a complete layout of all nodes in a node database can be realized, with no overlapping either among the nodes or among the node groups. Thus, the logic relationship among the nodes and among the node groups can be clearly illustrated, thereby improving the efficiency of node database interpretation.

DETAIL DESCRIPTION OF THE EMBODIMENTS

Many exemplary details are described below to facilitate thorough understanding of the specification. However, the specification may be implemented in many other manners different from the description herein. Those skilled in the art may make similar extensions without departing from the connotation of the specification. Therefore, the specification is not limited by the exemplary embodiments disclosed below.

Terms used in one or more embodiments of the specification are only for the purpose of describing particular embodiments, rather than limiting one or more embodiments of the specification. "a," "the," and "said" in the singular form used in one or more embodiments of the specification and the appended claims are intended to include the plural form as well, unless clearly indicated in the context to have other meanings. It should also be understood that the term "and/or" used in one or more embodiments of the specification refers to and includes any or all possible combinations of one or more associated listed items.

It should be understood that terms such as "first," "second," and the like may be used in one or more embodiments of the specification to describe various information, but the information shall not be limited to these terms. These terms are only used to differentiate information of the same type from each other. For example, without departing from the scope of one or more embodiments of the specification, "first" may also be referred to as "second," and similarly, "second" may also be referred to as "first." Depending on the context, the term "if" used here may be construed as "when . . . " or "at the time of . . . " or "in response to determination."

The specification provides a node layout determining method. Meanwhile, the specification relates to a node layout determining apparatus, a computing device, and a computer readable medium, which will be described in detail one by one in the following embodiments.

Figure 1:
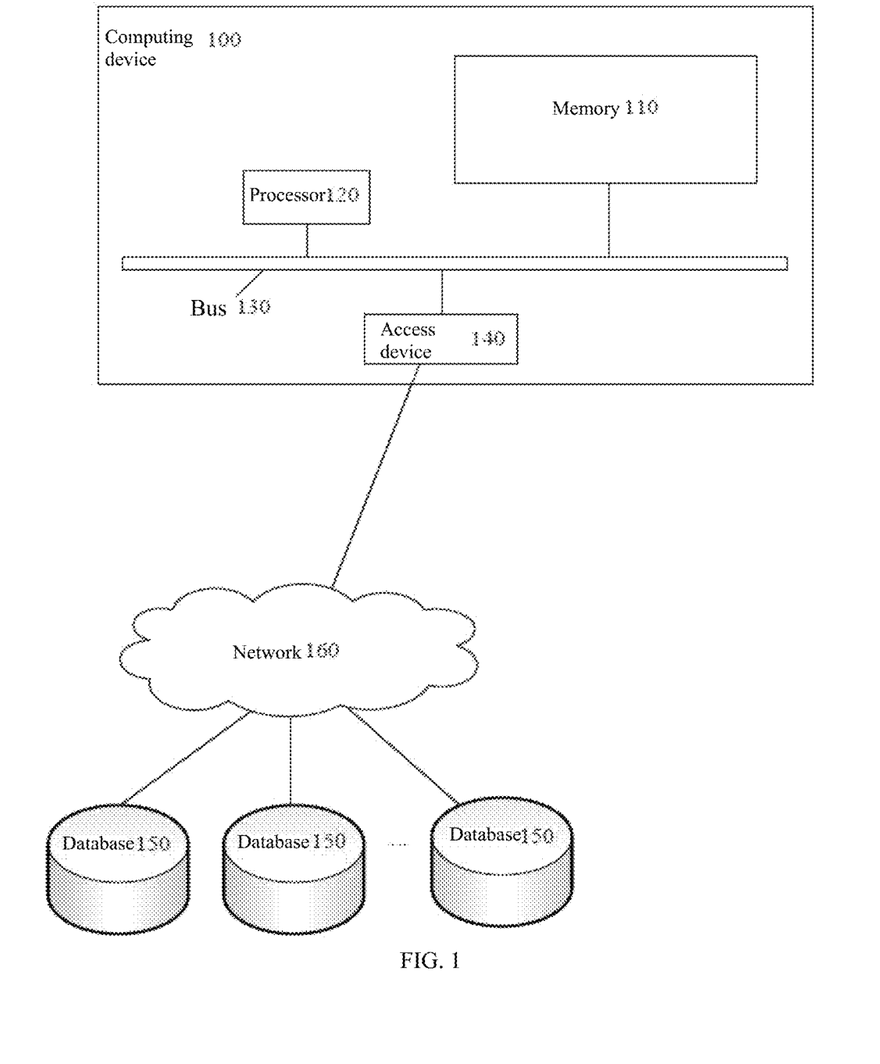
FIG. 1 is a structural block diagram of a computing device according to some embodiments of the specification.

FIG. 1 is a structural block diagram of a computing device 100 according to some embodiments of the specification. Components of the computing device 100 may include, but are not limited to, a memory 110 and a processor 120. The processor 120 and the memory 110 may be connected to each other via a bus 130, and the database 150 may be used for storing data.

The computing device 100 may further include an access device 140. The access device 140 may enable the computing device 100 to communicate via one or more networks 160. Examples of these networks may include a public switched telephone network (PSTN), a local area network (LAN), a wide area network (WAN), a personal area network (PAN), or a combination of communication networks like the Internet. The access device 140 may include one or more of any type of wired or wireless network interfaces (e.g., a network interface card (NIC)), such as an IEEE 802.11 wireless local area network (WLAN) wireless interface, a Worldwide Interoperability for Microwave Access (Wi-MAX) interface, an Ethernet interface, a universal serial bus (USB) interface, a cellular network interface, a Bluetooth interface, a near field communication (NFC) interface, etc.

In some embodiments of the specification, the above components of the computing device 100 and other components not shown in FIG. 1 may also be connected with each other, for example, via a bus. It should be understood that the structural block diagram of the computing device shown in FIG. 1 is for exemplary purpose only, rather than a limitation to the scope of the specification. Those skilled in the art may add or replace with other components as needed.

The computing device 100 may be a static or mobile computing device of any type, including a mobile computer or a mobile computing device (e.g., a tablet computer, a personal digital assistant, a laptop computer, a notebook computer, a netbook, etc.), a mobile phone (e.g., a smart phone), a wearable computing device (e.g., a smart watch, smart glasses, etc.) or other types of mobile devices, or a static computing device, such as a desktop computer or PC. The computing device 100 may also be a mobile or stationary server.

Figure 2:
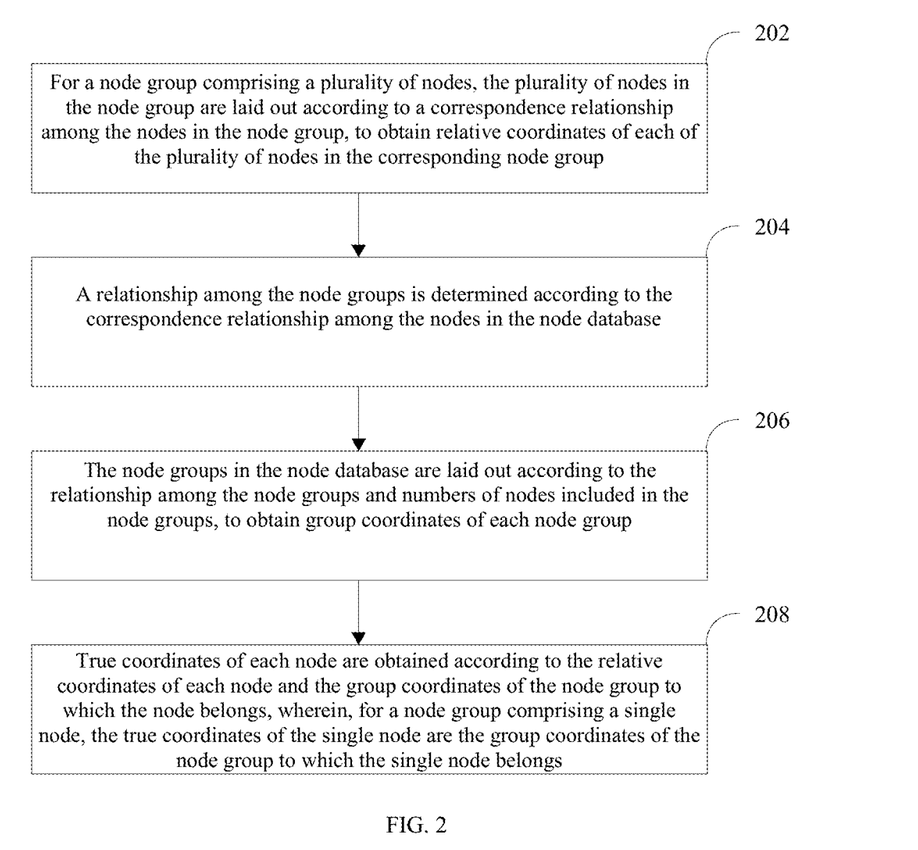
FIG. 2 is a schematic flow chart of a node layout determining method according to some embodiments of the specification.

The processor 120 may perform the node layout determining method as shown in FIG. 2. FIG. 2 is a flow chart of the node layout determining method according to some embodiments of the specification. The method may include steps 202 through 208.

The node layout determining method according to some embodiments of the specification may be applicable to a node database including a plurality of node groups, each of the node groups may include at least one node, and each node may correspond to only one of the node groups.

Each node in the node database may correspond to a data element. As described above, to more intuitively and efficiently process data in the node database, a logic relationship among data elements in the node database can be intuitively observed through a node layout determining process. For example, a tree-structured layout diagram or a flow chart may be formed. It should be understood that the particular content of a data element is determined according to a particular application scenario of the node database. For example, in a real-time computation scenario, some operators for completing a computation task may be used, and therefore, the nodes may actually be operators in the real-time computation task. The correspondence relationship among the nodes may be the flow relationship among the operators. However, particular types and content of the node database and nodes are not limited in the embodiments of the specification.

The node layout determining method according to some embodiments of the specification may include the following steps.

In step 202, for a node group including a plurality of nodes, the plurality of nodes in the node group may be laid out according to a correspondence relationship among the nodes in the node group, to obtain relative coordinates of each of the plurality of nodes in the corresponding node group.

For a node group including a plurality of nodes, since the layout may be performed on nodes inside the node group, display locations of the nodes inside a display region corresponding to the node group, determined according to the relative coordinates, do not overlap.

Figure 3A:
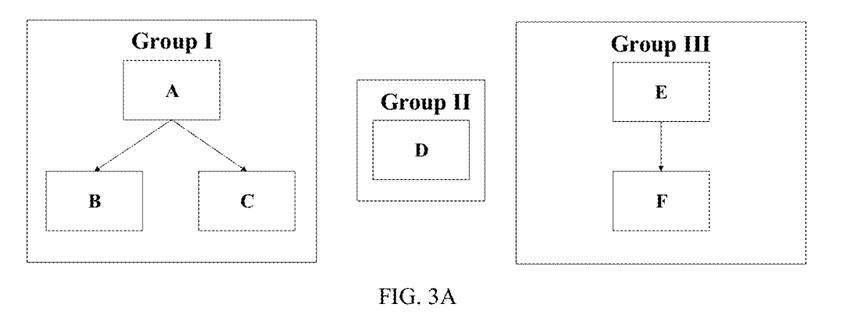
FIGS. 3A, 3B, 3C, 3D, and 3E are schematic diagrams of the principle of the node layout determining method according to some embodiments of the specification.

In the example shown in FIG. 3A, the node database may include six nodes, A, B, C, D, E, and F. There is a flow relationship from A to B, a flow relationship from A to C, a flow relationship from B to D, a flow relationship from C to E, and a flow relationship from E to F. A, B, and C belong to Group I, D belongs to Group II, and E and F belong to Group III. By performing layout inside the node group, relative coordinates of each node inside the rectangular display region corresponding to the node group may be obtained. Thus, the layout form of each node inside the node group may be as shown in FIGS. 3A. A, B, and C are inside the display region of Group I, the flow relationship from A to B may be represented by an arrow, and the flow relationship from A to C may be represented by an arrow. D is inside the display region of Group II. E and F are inside the display region of Group III, and the flow relationship from E to F may be represented by an arrow.

In some embodiments of the specification, the Dagre layout algorithm may be adopted to implement the process of laying out the nodes in the node group. Dagre is a JavaScript library used for plotting relational graphs and can easily implement automatic layout and plot directional graphs at a client. By using Dagre, only some basic information (e.g., the size of a node) are needed to implement graphical layout, and graphs can be plotted quickly. However, it should be understood that other layout algorithms may also be adopted in some embodiments of the specification to implement the process of laying out the nodes in the node group and to obtain relative coordinates of the nodes. Types of particular layout algorithms adopted are not limited in the embodiments of the specification.

In step 204, a relationship among the node groups may be determined according to the correspondence relationship among the nodes in the node database.

Figure 4:
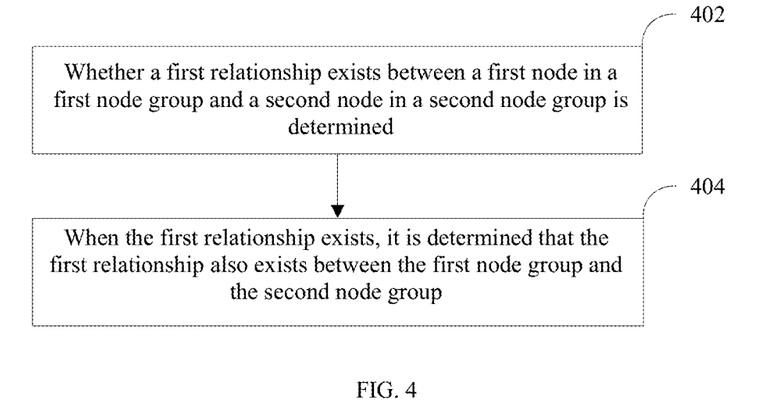
FIG. 4 is a schematic flow chart of a process of determining a relationship among node groups according to some embodiments of the specification.

In some embodiments of the specification, as shown in FIG. 4, the process of determining a relationship among the node groups may comprise the following steps 402 and 404.

In step 402, whether a first relationship exists between a first node in a first node group and a second node in a second node group may be determined.

In step 404, when the first relationship exists, it is determined that the first relationship also exists between the first node group and the second node group.

For example, since the first node group may include a plurality of nodes, the process of implementing the above step 402 and step 404 may be performed on each node in the first node group one by one. That is, whether a relationship exists between each node in the first node group and other node groups may be determined by repeatedly executing the step 402 and step 404, and whether a relationship exists between the first node group and other node groups may be determined accordingly.

For example, in the example shown in FIG. 3A, since there is a flow relationship from B to D, B belongs to Group I, and D belongs to Group II, it can thus be determined that there is also a flow relationship from Group I to Group II. Since there is a flow relationship from C to E, C belongs to Group I, and E belongs to Group III, it can thus be determined that there is also a flow relationship from Group I to Group III. In another example, there is a flow relationship from both B and C to E and from D to F, it can thus be determined that there is a flow relationship from Group I to Group III and also from Group II to Group III.

In step 206, the node groups in the node database may be laid out according to the relationship among the node groups and numbers of nodes included in the node groups, to obtain group coordinates of each node group.

Figure 3B:
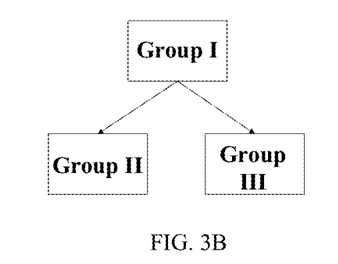
Figure 3C:
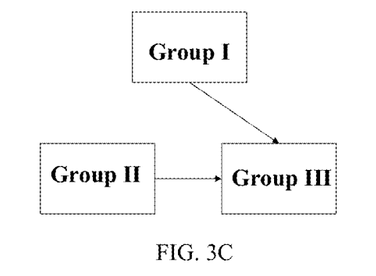

For example, after flow relationships among the node groups are determined, the node groups may be laid out as layout objects, and group coordinates of each node group may thus be obtained. For example, as shown in FIG. 3B, since it is determined that there is a flow relationship from Group I to Group II and also a flow relationship from Group I to Group III, a layout diagram plotted with the obtained group coordinates of the node groups after the node groups have been laid out may be the diagram shown in FIG. 3B. It should be understood that the layout diagram plotted with the obtained group coordinates of the node groups may be determined by flow relationships among the nodes. For example, when a flow relationship exists from both B and C to E and a flow relationship exists from D to F, a layout diagram plotted with the obtained group coordinates of the node groups may be the diagram shown in FIG. 3C, in which a flow relationship exists from Group I to Group III and also from Group II to Group III.

It should be understood that the Dagre layout algorithm may also be adopted to implement the process of laying out the node groups in some embodiments of the specification. However, it should be understood that, in some embodiments of the specification, other layout algorithm may also be adopted to implement the process of laying out the node groups and to obtain group coordinates of the node groups. Types of particular layout algorithms adopted are not limited in the embodiments of the specification.

In step 208, true coordinates of each node may be obtained according to the relative coordinates of each node and the group coordinates of the node group to which the node belongs. For a node group including a single node, the true coordinates of the single node may be the group coordinates of the node group to which the single node belongs.

Figure 3D:
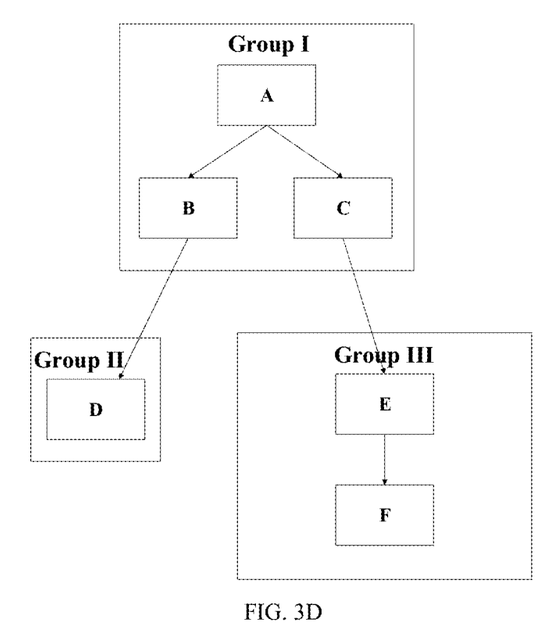
Figure 3E:
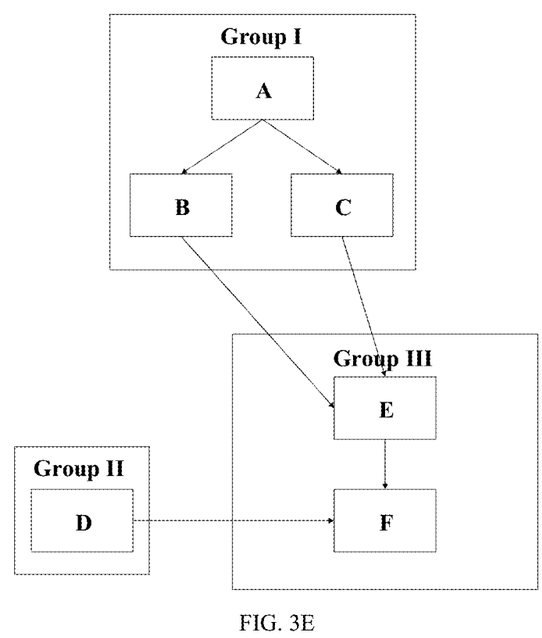

After the relative coordinates of each node in a corresponding node group and the group coordinates of the node group have been obtained, the final true coordinates of the node may be obtained through conversion. For a node group including only one single node, since the single node does not have relative coordinates, the group coordinates of the node group may be used directly as the true coordinates of the single node for the location of the single node. In some embodiments of the specification, a directional acyclic graph corresponding to the node database may be plotted based on the obtained true coordinates of each node. Nodes in the directional acyclic graph have no collision or overlapping, and display regions corresponding to the node groups do not overlapped either. For example, as shown in FIG. 3D, after true coordinates of each node have been obtained, the plotted directional acyclic graph may have display regions corresponding to Group I, Group II, and Group III, which are not overlapped and have clear flow directions. Moreover, nodes inside Group I, Group II, and Group III, respectively, have no collision or overlapping and have clear flow directions. When a flow relationship exists from both B and C to E and a flow relationship exists from D to F, a directional acyclic graph plotted accordingly may be as shown in FIG. 3E.

It should be understood that, in the examples shown in FIGS. 3A, 3B, 3C, 3D, and 3E, the relative coordinates and the group coordinates are 2-dimensional (2-D) coordinates, and all the plotted layout diagrams are planar graphs. However, in some other embodiments of the specification, the node database may be more complicated, the relative coordinates and the group coordinates may have more dimensions, and plotted layout diagrams may also have more dimensions. Particular dimensions of the relative coordinates and the group coordinates are not limited in the embodiments of the specification.

According to the node layout determining method in some embodiments of the specification, a relationship among node groups may be determined according to a correspondence relationship among nodes, and layout may be performed with the node groups being regarded as layout objects, thereby effectively preventing display regions of the node groups from overlapping. Meanwhile, there is no overlapping among display regions corresponding to the nodes as the nodes are laid out within a node group. Since relative coordinates of each node within a corresponding node group may be obtained in the layout process inside the node group, true coordinates of each node may be obtained in combination with the group coordinates of the node group after the layout. Therefore, by adopting the node layout determining method provided in some embodiments of the specification, a complete layout of all nodes in a node database can be implemented, and there is no overlapping either among the nodes or among the node groups. Thus, the logic relationship among the nodes and among the node groups can be clearly illustrated, thereby improving the efficiency of node database interpretation.

Figure 5:
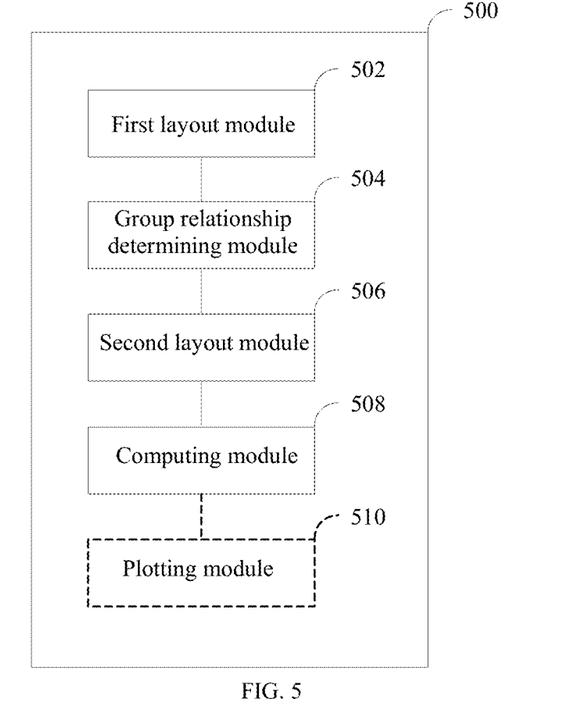
FIG. 5 is a schematic structural diagram of a node layout determining apparatus according to some embodiments of the specification.

Corresponding to the above-described method embodiment, the specification further provides a node layout determining apparatus embodiment. FIG. 5 is a schematic structural diagram of the node layout determining apparatus according to some embodiments of the specification. The node layout determining apparatus 500 is applicable to a node database including a plurality of node groups. Each of the node groups may include at least one node, and each node in the node database may correspond to only one of the node groups. The layout determining apparatus may include a memory and a processor, the memory may be configured with instructions executable by the processor the cause the processor the perform the operations described below.

As shown in FIG. 5, the node layout determining apparatus 500 may include a first layout module 502, a group relationship determining module 504, a second layout module 506, and a computing module 508.

The first layout module 502 may be configured to lay out, for a node group including a plurality of nodes, the plurality of nodes in the node group according to a correspondence relationship among the nodes in the node group, to obtain relative coordinates of each of the plurality of nodes in the corresponding node group.

The group relationship determining module 504 may be configured to determine a relationship among the node groups according to the correspondence relationship among the nodes in the node database.

The second layout module 506 may be configured to lay out the node groups in the node database according to the relationship among the node groups and numbers of nodes included in the node groups, to obtain group coordinates of each node group.

The computing module 508 may be configured to obtain true coordinates of each node according to the relative coordinates of each node and the group coordinates of the node group to which the node belongs. For a node group including a single node, the true coordinates of the single node are the group coordinates of the node group to which the single node belongs.

According to the node layout determining apparatus in some embodiments of the specification, a relationship among node groups may be determined according to a correspondence relationship among nodes, and layout may be performed with the node groups being regarded as layout objects, thereby effectively preventing display regions of the node groups from overlapping. Meanwhile, there is no overlapping among display regions corresponding to the nodes as the nodes are laid out within a node group. Since relative coordinates of each node within a corresponding node group may be obtained in the layout process inside the node group, true coordinates of each node may be obtained in combination with the group coordinates of the node group after the layout. Therefore, by adopting the node layout determining method provided in some embodiments of the specification, a complete layout of all nodes in a node database can be implemented, and there is no overlapping either among the nodes or among the node groups. Thus, the logic relationship among the nodes and among the node groups can be clearly illustrated, thereby improving the efficiency of node database interpretation.

In some embodiments, the group relationship determining module 504 may be further configured to determine, when a first relationship exists between a first node in a first node group and a second node in a second node group, that the first relationship also exists between the first node group and the second node group.

In some embodiments, the relative coordinates and the group coordinates may be 2-D coordinates.

In some embodiments, as shown in FIG. 5, the node layout determining apparatus 500 may further include a plotting module 510 configured to plot, based on the true coordinates of each node, a directional acyclic graph corresponding to the node database.

In some embodiments, the first layout module 502 and the second layout module 506 may be configured to obtain the relative coordinates of each node and the group coordinates of each node group through the Dagre layout algorithm.

In some embodiments, the nodes may be operators in a real-time computation task, and there may be a flow relationship among the operators.

Particular functions and operations of each module in the above-described node layout determining apparatus have been described in detail in the above-described node layout determining method, which therefore will not be repeated herein.

In some embodiments of the specification, a computing device may be further provided. The computing device may include a memory, a processor, and computer instructions stored on the memory and executable by the processor. The processor, upon executing the instruction, may perform any one of the above-described node layout determining methods.

In some embodiments of the specification, a computer readable storage medium may be further provided. The computer readable storage medium may store computer instructions. Upon being executed by a processor, the computer instructions may perform any one of the above-described node layout determining methods.

An exemplary solution of the computer readable storage medium according to some embodiments is described above. It should be noted that the technical solution of the storage medium and the technical solution of the above-described node layout determining method belong to the same concept. For any details of the technical solution of the storage medium that are not described in detail, the above description of the technical solution of the node layout determining method may be referenced.

Particular embodiments of the specification are described above, and other embodiments fall within the scope of the appended claims. In some cases, actions or steps stated in the claims may be executed in an order different from those in the embodiments and can still achieve desired results. In addition, a process depicted in the accompanying drawings does not necessarily require the illustrated particular order or continuous order to achieve desired results. In some implementation manners, multi-task processing and parallel processing may be feasible or may be beneficial.

The computer instructions may comprise computer program codes, and the computer program codes may be in the form of source code, object code, executable file or some intermediate forms. The computer readable medium may include any entity or device capable of carrying the computer program codes, a record medium, a USB stick, a portable hard drive, a magnetic disk, an optical disc, a computer memory, a Read-Only Memory (ROM), a Random Access Memory (RAM), an electric carrier wave signal, a telecommunication signal, and a software distribution medium. It should be noted that the content contained in the computer readable medium may be properly added or deleted as required by legislative and patent practices in the jurisdictions. For example, in some jurisdictions, the computer readable medium does not include electric carrier wave signals or telecommunication signals according to legislative and patent practices.

It should be noted that, for simple description, the above-described method embodiments are all expressed as a series of action combinations. However, those skilled in the art should be aware that the specification is not limited by the described order of actions, as according to the specification, some steps may be implemented in other orders or simultaneously. Second, those skilled in the art should also be aware that all the embodiments described in the specification are preferred embodiments, and not all the involved actions and modules are necessarily required by the specification.

The above embodiments are described with various focuses. For a part of an embodiment that is not described in detail, the relevant description of other embodiments may be referenced.

The preferred embodiments of the specification disclosed above are merely used to help describe the specification. Some embodiments do not thoroughly describe all details or limit the present invention only to the described exemplary implementation manners. Obviously, many modifications and variations may be made according to the content of the specification. The specification selects and describes these embodiments in detail for the purpose of better explaining principles and exemplary applications of the specification, so that those skilled in the art can better understand and use the specification. The specification is only subject to the claims and the full scope and equivalents of the claims.

The invention claimed is:

1. A computer-implemented method for determining a layout of a plurality of nodes stored in a node database, the method comprising:
   laying out, by a computing device of a computer and for each node group of node groups stored in the node database, the plurality of nodes in the node group according to a correspondence relationship among the nodes in the node group, to obtain relative coordinates of each node of the plurality of nodes in the node group, wherein the node database that comprises a first node group and a second node group is accessible by the computing device through a network connection, the first node group and the second node group comprising the plurality of nodes, each node in the node database corresponding to one of the node groups;
   determining, by the computing device, a group relationship between the first node group and the second node group according to the correspondence relationship among the nodes in the node database, by:
      traversing each node of the plurality of nodes in the first node group and each node of the plurality of nodes in the second node group,
      determining whether there exists the correspondence relationship between one of the plurality of nodes in the first node group and one of the plurality of nodes in the second node group, and
      determining, in response to a determination that there exists the correspondence relationship between the one of the plurality of nodes in the first node group and the one of the plurality of nodes in the second node group, that there exists the group relationship between the first node group and the second node group, the group relationship being identical as the correspondence relationship between the one of the plurality of nodes in the first node group and the one of the plurality of nodes in the second node group;
   automatically laying out, by the computing device and according to the group relationship among the node groups and a number of nodes included in each node group, the node groups in the node database, to obtain group coordinates of each node group, wherein the relative coordinates and the group coordinates are two-dimensional coordinates;
   obtaining, by the computing device and according to the relative coordinates of each node and the group coordinates of each node group, true coordinates of each node of the nodes in the node database through a Dagre layout algorithm, wherein for a node group comprising a single node, the true coordinates of the single node are the group coordinates of the node group to which the single node belongs; and
   displaying, on the computing device and according to the true coordinates of each node of the nodes, a plurality of display regions not overlapping with each other, each display region corresponding to one of the plurality of node groups, wherein the nodes in the node database are operators in a real-time computation task, and the correspondence relationship among the nodes is a flow relationship among the operators.

2. The method of claim 1, further comprising: plotting, based on the true coordinates of each node, a directional acyclic graph for the node database.

3. The method of claim 2, wherein the directional acyclic graph includes a plurality of display regions not overlapping with each other, and each node corresponding to one of the plurality of node groups.

4. The method of claim 1, further comprising: obtaining the relative coordinates of each node and the group coordinates of each node group through the Dagre layout algorithm.

5. An apparatus for determining a layout of a plurality of nodes stored in a node database, the apparatus comprising:
   a processor and a memory that stores instructions executable by the processor to perform operations comprising:
   laying out, by a computing device and for each node group of node groups stored in the node database, the plurality of nodes in the node group according to a correspondence relationship among the nodes in the node group, to obtain relative coordinates of each node of the plurality of nodes in the node group, wherein the node database that comprises a first node group and a second node group is accessible by the computing device through a network connection, the first node group and the second node group comprising the plurality of nodes, each node in the node database corresponding to one of the node groups;

determining, by the computing device, a group relationship between the first node group and the second node group according to the correspondence relationship among the nodes in the node database, by:

traversing each node of the plurality of nodes in the first node group and each node of the plurality of nodes in the second node group, determining whether there exists the correspondence relationship between one of the plurality of nodes in the first node group and one of the plurality of nodes in the second node group, and determining, in response to a determination that there exists the correspondence relationship between the one of the plurality of nodes in the first node group and the one of the plurality of nodes in the second node group, that there exists the group relationship between the first node group and the second node group, the group relationship being identical as the correspondence relationship between the one of the plurality of nodes in the first node group and the one of the plurality of nodes in the second node group;

automatically laying out, by the computing device and according to the group relationship among the node groups and a number of nodes included in each node group, the node groups in the node database, to obtain group coordinates of each node group, wherein the relative coordinates and the group coordinates are two-dimensional coordinates;

obtaining, by the computing device and according to the relative coordinates of each node and the group coordinates of each node group, true coordinates of each node of the nodes in the node database through a Dagre layout algorithm, wherein for a node group comprising a single node, the true coordinates of the single node are the group coordinates of the node group to which the single node belongs; and displaying, on the computing device and according to the true coordinates of each node of the nodes, a plurality of display regions not overlapping with each other, each display region corresponding to one of the plurality of node groups, wherein the nodes in the node database are operators in a real-time computation task, and the correspondence relationship among the nodes is a flow relationship among the operators.

6. The apparatus of claim 5, wherein the operations further comprise: plotting, based on the true coordinates of each node, a directional acyclic graph for the node database.

7. The apparatus of claim 6, wherein the directional acyclic graph includes a plurality of display regions not overlapping with each other, and each node corresponding to one of the plurality of node groups.

8. The apparatus of claim 5, wherein the operations further comprise: obtaining the relative coordinates of each node and the group coordinates of each node group through the Dagre layout algorithm.

9. The apparatus of claim 5, wherein the nodes in the node database are computing units in a real-time computation task, and there is a flow relationship among the computing units.

10. A non-transitory computer-readable storage medium storing instructions that are executed by a processor to to perform operations for determining a layout of a plurality of nodes stored in a node database, the operations comprising:

laying out, by a computing device and for each node group of node groups stored in the node database, the plurality of nodes in the node group according to a correspondence relationship among the nodes in the node group, to obtain relative coordinates of each node of the plurality of nodes in the node group, wherein the node database that comprises a first node group and a second node group is accessible by the computing device through a network connection, the first node group and the second node group comprising the plurality of nodes, each node in the node database corresponding to one of the node groups;

determining, by the computing device, a group relationship between the first node group and the second node group according to the correspondence relationship among the nodes in the node database, by:

traversing each node of the plurality of nodes in the first node group and each node of the plurality of nodes in the second node group, determining whether there exists the correspondence relationship between one of the plurality of nodes in the first node group and one of the plurality of nodes in the second node group, and determining, in response to a determination that there exists the correspondence relationship between the one of the plurality of nodes in the first node group and the one of the plurality of nodes in the second node group, that there exists the group relationship between the first node group and the second node group, the group relationship being identical as the correspondence relationship between the one of the plurality of nodes in the first node group and the one of the plurality of nodes in the second node group;

automatically laying out, by the computing device and according to the group relationship among the node groups and a number of nodes included in each node group, the node groups in the node database, to obtain group coordinates of each node group, wherein the relative coordinates and the group coordinates are two-dimensional coordinates;

obtaining, by the computing device and according to the relative coordinates of each node and the group coordinates of each node group, true coordinates of each node of the nodes in the node database through a Dagre layout algorithm, wherein for a node group comprising a single node, the true coordinates of the single node are the group coordinates of the node group to which the single node belongs; and displaying, on the computing device and according to the true coordinates of each node of the nodes, a plurality of display regions not overlapping with each other, each display region corresponding to one of the plurality of node groups, wherein the nodes in the node database are operators in a real-time computation task, and the correspondence relationship among the nodes is a flow relationship among the operators.

11. The non-transitory computer-readable storage medium of claim 10, wherein the operations further comprise: plotting, based on the true coordinates of each node, a directional acyclic graph for the node database.

12. The non-transitory computer-readable storage medium of claim 11, wherein the directional acyclic graph includes a plurality of display regions not overlapping with each other, and each node corresponding to one of the plurality of node groups.

13. The non-transitory computer-readable storage medium of claim 10, wherein the operations further comprise: obtaining the relative coordinates of each node and the group coordinates of each node group through the Dagre layout algorithm.

* * * * *

UNITED STATES PATENT AND TRADEMARK OFFICE
CERTIFICATE OF CORRECTION

| | |
|---|---|
| PATENT NO. | : 11,048,670 B2 |
| APPLICATION NO. | : 16/859795 |
| DATED | : June 29, 2021 |
| INVENTOR(S) | : Yifei Pan |

It is certified that error appears in the above-identified patent and that said Letters Patent is hereby corrected as shown below:

In the Claims

In Claim 10, Column 11, Line 67, "executed by a processor to to" should read -- executed by a processor to --.

Signed and Sealed this
Thirteenth Day of September, 2022

Katherine Kelly Vidal
*Director of the United States Patent and Trademark Office*